United States Patent
Kim et al.

(10) Patent No.: US 10,681,347 B2
(45) Date of Patent: Jun. 9, 2020

(54) METHOD AND APPARATUS OF FILTERING IMAGE IN IMAGE CODING SYSTEM

(71) Applicant: LG Electronics Inc., Seoul (KR)

(72) Inventors: Chulkeun Kim, Seoul (KR); Junghak Nam, Seoul (KR); Jaehyun Lim, Seoul (KR); Naeri Park, Seoul (KR); Jungdong Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/764,816

(22) PCT Filed: Sep. 23, 2016

(86) PCT No.: PCT/KR2016/010668
§ 371 (c)(1),
(2) Date: Mar. 29, 2018

(87) PCT Pub. No.: WO2017/057877
PCT Pub. Date: Apr. 6, 2017

(65) Prior Publication Data
US 2018/0295361 A1   Oct. 11, 2018

Related U.S. Application Data

(60) Provisional application No. 62/252,578, filed on Nov. 9, 2015, provisional application No. 62/234,648, filed on Sep. 29, 2015.

(51) Int. Cl.
*H04N 19/117* (2014.01)
*H04N 19/80* (2014.01)
(Continued)

(52) U.S. Cl.
CPC ......... *H04N 19/117* (2014.11); *H04N 19/147* (2014.11); *H04N 19/176* (2014.11);
(Continued)

(58) Field of Classification Search
CPC .. H04N 19/117; H04N 19/196; H04N 19/147; H04N 19/513; H04N 19/176;
(Continued)

(56) References Cited

U.S. PATENT DOCUMENTS

| | | | | |
|---|---|---|---|---|
| 8,045,813 | B2* | 10/2011 | Lee | H04N 19/82 382/238 |
| 8,792,549 | B2* | 7/2014 | Liu | H04N 19/176 375/240.01 |

(Continued)

FOREIGN PATENT DOCUMENTS

| | | |
|---|---|---|
| CN | 101641960 | 2/2010 |
| CN | 101641961 | 2/2010 |

(Continued)

OTHER PUBLICATIONS

Thomson Consumer Electronics R&D France, "New motion vector coding for H.26P," LBC-94-174, Study Group 15, Working Party 15/1 Expert's Group on Very Low Bitrate Video Telephony, Oct. 1994, 3 pages.

(Continued)

*Primary Examiner* — Dramos Kalapodas
(74) *Attorney, Agent, or Firm* — Fish & Richardson P.C.

(57) ABSTRACT

A filtering method performed by a decoding device according to the present invention comprises the steps of: deriving a specific neighboring block of a current block so as to derive filter information on the current block; deriving the specific neighboring block and a reference block within a reference picture corresponding to the specific neighboring block; deriving the filter information on the current block on the basis of the specific neighboring block and the reference block; and filtering the current block on the basis of the filter information. According to the present invention, the overall coding efficiency can be improved by deriving the filter information on the basis of the neighboring block of the (Continued)

already decoded current block and reducing or removing the amount of data for the transmission of the information necessary for filter generation.

7 Claims, 12 Drawing Sheets

(51) Int. Cl.
| | |
|---|---|
| H04N 19/42 | (2014.01) |
| H04N 19/196 | (2014.01) |
| H04N 19/44 | (2014.01) |
| H04N 19/82 | (2014.01) |
| H04N 19/147 | (2014.01) |
| H04N 19/176 | (2014.01) |
| H04N 19/513 | (2014.01) |

(52) U.S. Cl.
CPC ........... *H04N 19/196* (2014.11); *H04N 19/42* (2014.11); *H04N 19/44* (2014.11); *H04N 19/513* (2014.11); *H04N 19/80* (2014.11); *H04N 19/82* (2014.11)

(58) Field of Classification Search
CPC .... H04N 19/59; H04N 19/186; H04N 19/167; H04N 19/174; H04N 19/82; H04N 19/44; H04N 19/42; H04N 19/80
See application file for complete search history.

(56) References Cited

U.S. PATENT DOCUMENTS

| | | | | |
|---|---|---|---|---|
| 2006/0147123 A1* | 7/2006 | Kajihata | ............... | H04N 19/176 382/239 |
| 2006/0222080 A1* | 10/2006 | Wang | ................... | H04N 19/593 375/240.24 |
| 2006/0280372 A1* | 12/2006 | Han | ...................... | H04N 19/105 382/240 |
| 2008/0240592 A1* | 10/2008 | Lee | ........................ | H04N 19/82 382/238 |
| 2009/0046207 A1* | 2/2009 | Salvucci | ................. | G06T 9/001 348/663 |
| 2011/0026599 A1* | 2/2011 | Andersson | ........... | H04N 19/176 375/240.16 |
| 2011/0225191 A1* | 9/2011 | Xie | ........................ | G06F 16/22 707/775 |
| 2012/0328013 A1* | 12/2012 | Budagavi | ............... | H04N 19/96 375/240.12 |
| 2013/0301720 A1* | 11/2013 | Lee | ....................... | H04N 19/159 375/240.12 |
| 2014/0192876 A1* | 7/2014 | Yie | ....................... | H04N 19/176 375/240.12 |
| 2014/0286442 A1* | 9/2014 | Kim | ....................... | H04N 19/82 375/240.29 |
| 2015/0326866 A1* | 11/2015 | Ikai | ........................ | H04N 19/70 375/240.25 |
| 2016/0241835 A1* | 8/2016 | Ikai | ........................ | H04N 19/70 |

FOREIGN PATENT DOCUMENTS

| | | | | |
|---|---|---|---|---|
| CN | 103348677 | | 10/2013 | |
| CN | 103348677 A | * | 10/2013 | ........... H04N 19/136 |
| CN | 103733624 | | 4/2014 | |
| CN | 103733624 A | * | 4/2014 | ............ H04N 19/80 |
| EP | 2127396 A1 | * | 12/2009 | ........... H04N 19/176 |
| EP | 2697973 A1 | * | 2/2014 | ........... H04N 19/117 |
| KR | 10-2005-0018730 | | 2/2005 | |
| KR | 10-2008-0088046 | | 10/2008 | |
| KR | 10-2011-0053245 | | 5/2011 | |
| KR | 10-2012-0090740 | | 8/2012 | |
| KR | 10-2014-0098672 | | 8/2014 | |
| WO | WO2013/055148 | | 4/2013 | |
| WO | WO-2013055148 A2 | * | 4/2013 | ........... H04N 19/527 |
| WO | WO2013155897 | | 10/2013 | |

OTHER PUBLICATIONS

Chiu et al., "Decoder-side Motion Estimation and Wiener Filter From HEVC," Intel Corporation, Nov. 2013, 6 pages.

Extended European Search in European Appln. No. 16852023.7, dated Feb. 27, 2019, 12 pages.

* cited by examiner

METHOD AND APPARATUS OF FILTERING IMAGE IN IMAGE CODING SYSTEM

CROSS-REFERENCE TO RELATED APPLICATIONS

This application is the National Stage filing under 35 U.S.C. 371 of International Application No. PCT/KR2016/010668, filed on Sep. 23, 2016, which claims the benefit of U.S. Provisional Applications No. 62/234,648 filed on Sep. 29, 2015, and No. 62/252,578 filed on Nov. 9, 2015, the contents of which are all hereby incorporated by reference herein in their entirety.

BACKGROUND OF THE INVENTION

Field of the Invention

The present disclosure relates to an image coding technique, and more particularly to an image filtering method and device in an image coding system.

Related Art

The need for images of high resolution and high quality has recently been increasing in various fields. As the resolution and quality of an image is improved, the amount of data in the image is also likewise increased.

Due to the increase in the amount of information, devices with various performance and networks of various environments are emerging. With the emergence of devices with diverse capabilities and networks of diverse environments, it has become possible to use the same content at varying levels of quality.

Specifically, due to the fact that the image quality that the terminal device can support is diversified, and the network environment that is constructed becomes various, in some environments, images of general quality are used, while, in other environments, images of higher quality are available.

For example, a consumer who purchases video content from a mobile terminal may view the same video content on a larger screen and with a higher resolution using a large screen for home use.

In recent years, as broadcasts with full high definition (FHD) resolution are being served, many users are already accustomed to the image of high resolution and high quality, and service providers and users are interested in use of services superior to UHD Ultra (High Definition) and FHD.

Accordingly, an image filtering method is required to further improve the subjective/objective image quality.

SUMMARY OF THE INVENTION

The technical challenge of the present disclosure is to provide a method and device for improving the image coding efficiency.

Another technical challenge of the present disclosure is to provide a method and device for improving the subjective/objective quality of the image.

Still another technical challenge of the present disclosure is to provide an image filtering method and device.

Still yet another technical challenge of the present disclosure is to provide an image filtering method and device using previously decoded information prior to a decoding process of a current block.

In a first aspect of the present disclosure, there is provided a filtering method performed by an encoder, the method comprising: deriving a specific neighboring block to a current block for derivation of information about a filter for the current block; deriving a reference block in a reference picture corresponding to the specific neighboring block; deriving the information about the filter for the current block based on the specific neighboring block and the reference block; filtering the current block based on the information about the filter; and encoding and outputting information about the filtering performed on the current block.

In a second aspect of the present disclosure, there is provided a filtering method performed by an encoder, the method comprising: deriving a motion vector of a current block based on a neighboring block to the current block; deriving a reference block on a reference picture based on the motion vector; deriving first neighboring samples to the current block and second neighboring samples to the reference block for derivation of information about a filter for the current block; deriving the filter information for the current block based on the first neighboring samples and the second neighboring samples; filtering the current block based on the filter information; and encoding and outputting information about the filtering performed on the current block.

In a third aspect of the present disclosure, there is provided an encoder for performing filtering, the encoder comprising: a filter configured for deriving a specific neighboring block to a current block for derivation of information about a filter for the current block; deriving a reference block in a reference picture corresponding to the specific neighboring block; deriving the information about the filter for the current block based on the specific neighboring block and the reference block; filtering the current block based on the information about the filter; and an entropy encoder configured for encoding and outputting information about the filtering performed on the current block.

In a fourth aspect of the present disclosure, there is provided an encoder for performing filtering, the encoder comprising: a predictor configured for deriving a motion vector of a current block based on a neighboring block to the current block; deriving a reference block on a reference picture based on the motion vector; a filter configured for deriving first neighboring samples to the current block and second neighboring samples to the reference block for derivation of information about a filter for the current block; deriving the filter information for the current block based on the first neighboring samples and the second neighboring samples; filtering the current block based on the filter information; and an entropy encoder configured for encoding and outputting information about the filtering performed on the current block.

In a fifth aspect of the present disclosure, there is provided a filtering method performed by a decoder, the method comprising: deriving a specific neighboring block to a current block for derivation of information about a filter for the current block; deriving a reference block in a reference picture corresponding to the specific neighboring block; deriving the information about the filter for the current block based on the specific neighboring block and the reference block; filtering the current block based on the information about the filter.

In a sixth aspect of the present disclosure, there is provided a filtering method performed by a decoder, the method comprising: deriving a motion vector of a current block based on a neighboring block to the current block; deriving a reference block on a reference picture based on the motion vector; deriving first neighboring samples to the current block and second neighboring samples to the reference block for derivation of information about a filter for the current block; deriving the filter information for the current block based on the first neighboring samples and the second neighboring samples; filtering the current block based on the filter information.

In a seventh aspect of the present disclosure, there is provided a decoder for performing filtering, the decoder comprising: a filter configured for deriving a specific neighboring block to a current block for derivation of information about a filter for the current block; deriving a reference block in a reference picture corresponding to the specific neighboring block; deriving the information about the filter for the current block based on the specific neighboring block and the reference block; filtering the current block based on the information about the filter.

In an eighth aspect of the present disclosure, there is provided a decoder for performing filtering, the decoder comprising: a predictor configured for deriving a motion vector of a current block based on a neighboring block to the current block; deriving a reference block on a reference picture based on the motion vector; and a filter configured for deriving first neighboring samples to the current block and second neighboring samples to the reference block for derivation of information about a filter for the current block; deriving the filter information for the current block based on the first neighboring samples and the second neighboring samples; filtering the current block based on the filter information.

According to the present disclosure, it is possible to improve the subjective/objective picture quality and the coding efficiency by filtering a current block.

According to the present disclosure, filter information may be derived based on neighboring blocks or neighboring samples to a current block that have already been decoded. This reduces or eliminates the amount of data needed for transmission of information needed to generate the filter, thereby improving the overall coding efficiency.

According to the present disclosure, neighboring blocks or neighboring samples to the current block may be selected to derive the type of the filter for the current block and the information used for generating the filter. This enables adaptive determination of whether or not the filter is applied, the filter shape, and the filter coefficient. This allows efficient filtering to be effectively applied to the image characteristics of each image region.

DESCRIPTION OF EXEMPLARY EMBODIMENTS

Figure 1:
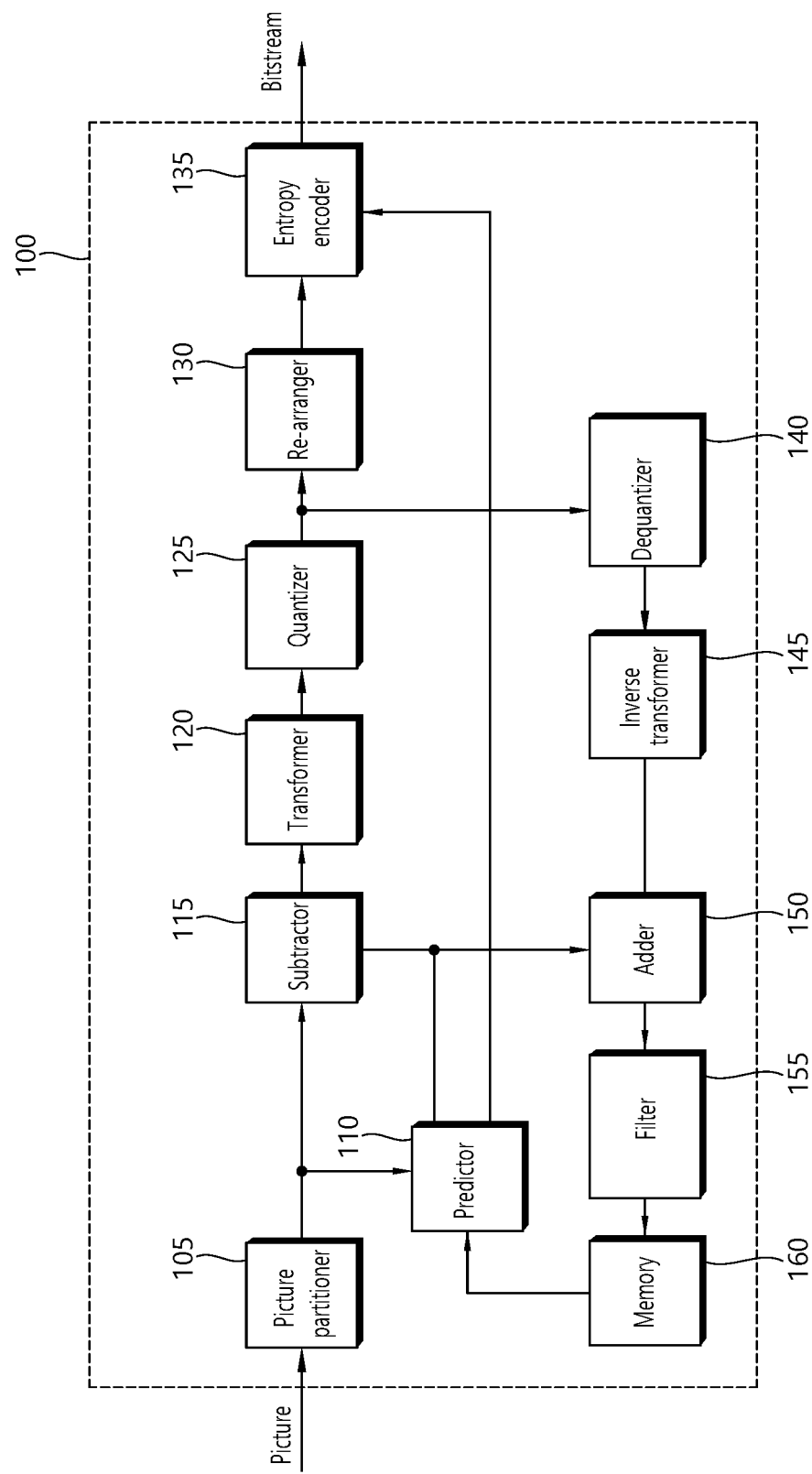
FIG. 1 is a block diagram schematically illustrating a video encoder according to an embodiment of the invention.

The present invention can be modified in various forms, and specific embodiments thereof will be described and shown in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoder according to an embodiment of the invention.

Referring to FIG. 1, a video encoder 100 includes a picture partitioner 105, a predictor 110, a transformer 115, a quantizer 120, a re-arranger 125, an entropy encoder 130, a dequantizer 135, an inverse transformer 140, a filter 145, and a memory 150.

The picture partitioner 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a lower depth as a quad-tree structures. The PU and TU may be obtained from the CU. For example, the PU may be partitioned from a CU into a symmetric or asymmetric square structure. Further, the TU may be split into a quad tree structure from the CU.

The predictor 110 includes an inter predictor that performs an inter prediction process and an intra predictor that performs an intra prediction process, as will be described later. The predictor 110 performs a prediction process on the processing units of a picture divided by the picture partitioner 105 to create a prediction block including a prediction sample or a prediction sample array. In the predictor 110, the processing unit of a picture may be a CU, a TU, or a PU. The predictor 110 may determine whether the prediction performed on the corresponding processing unit is an inter prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

The inter prediction may use a skip mode, a merge mode, or Advanced Motion Vector Prediction (AMVP). In the inter prediction, a reference picture may be selected for the PU, and a reference block corresponding to the PU may be selected. The reference block may be an integer pixel or sample unit, or a fractional pixel or sample unit. The prediction block is then generated for which the residual signal relative to the current PU is minimized and the motion vector size is minimized.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter prediction, the motion vector difference MDV, the motion vector predictor MVP, residual signal, etc., may be entropy encoded and then transmitted to the decoder. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be constructed after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transformer 115. The prediction mode information, the motion vector information, and the like used for the prediction are encoded along with the residual values by the entropy encoder 130 and are transmitted to the decoder.

The transformer 115 performs a transform process on the residual block in the unit of TUs and creates transform coefficients.

A transform block is a rectangular block of samples and is a block to which the same transform is applied. The transform block may be a TU and may have a quad-tree structure.

The transformer 115 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transformer 115 may construct a transform block of transform coefficients through the transform.

The quantizer 120 may quantize the residual values, that is, transform coefficients, transformed by the transformer 115 and may create quantization coefficients. The values calculated by the quantizer 120 may be supplied to the dequantizer 135 and the re-arranger 125.

The re-arranger 125 may rearrange the transform coefficients supplied from the quantizer 120. By rearranging the quantization coefficients, it is possible to enhance the encoding efficiency in the entropy encoder 130.

The re-arranger 125 may rearrange the quantized transform coefficients in the form of a two-dimensional block to the form of a one-dimensional vector through the use of a coefficient scanning method.

The entropy encoder 130 may be configured to entropy code the symbol according to a probability distribution based on the quantized transform values rearranged by the re-arranger 125 or the encoding parameter value calculated during the encoding process, etc. and then to output a bit stream. The entropy encoding method is a method of receiving a symbol having various values and expressing the symbol as a binary string that can be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that can be inferred during encoding or decoding, as well as information encoded in an encoder and passed to a decoder like the syntax element. The encoding parameter is the information needed to encode or decode the image. The encoding parameter may include statistics or values such as for example, the intra/inter prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal can be called as a residual block in a block unit, and can be called as a residual sample in a sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential golomb, Context-Adaptive Variable Length Coding (CAVLC), and Context-Adaptive Binary Arithmetic Coding (CABAC) may be used for the entropy encoding. For example, the entropy encoder 130 may store therein a table for performing entropy encoding, such as a variable length coding/code (VLC) table. The entropy encoder 130 may perform entropy encoding using the stored VLC table. Further, the entropy encoder 130 derives a binarization method of a corresponding symbol and a probability model of a corresponding symbol/bin, and then performs entropy encoding using the derived binarization method or probability model.

The entropy encoder 130 may give a predetermined change to a parameter set or syntaxes to be transmitted, if necessary.

The dequantizer 135 dequantizes the values transform coefficients quantized by the quantizer 120. The inverse transformer 140 inversely transforms the values dequantized by the dequantizer 135.

The residual value or residual sample or residual sample array generated by the dequantizer 135 and the inverse-transformer 140, and the prediction block predicted by the predictor 110 may be combined to form a reconstructed block including a reconstructed sample or a reconstructed sample array.

In FIG. 1, a residual block and a prediction block are added to create a reconstructed block by an adder. At this time, the adder may be considered as a particular element reconstructed block generator that generates a reconstructed block.

The filter 145 applies a deblocking filter, an ALF Adaptive Loop Filter, an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

On the other hand, the filter 145 may not perform a filtering operation on the reconstructed block used in the inter prediction.

The memory 150 may store the reconstructed block or picture calculated by the filter 145. The reconstructed block or picture stored in the memory 150 may be supplied to the predictor 110 that performs the inter prediction.

Figure 2:
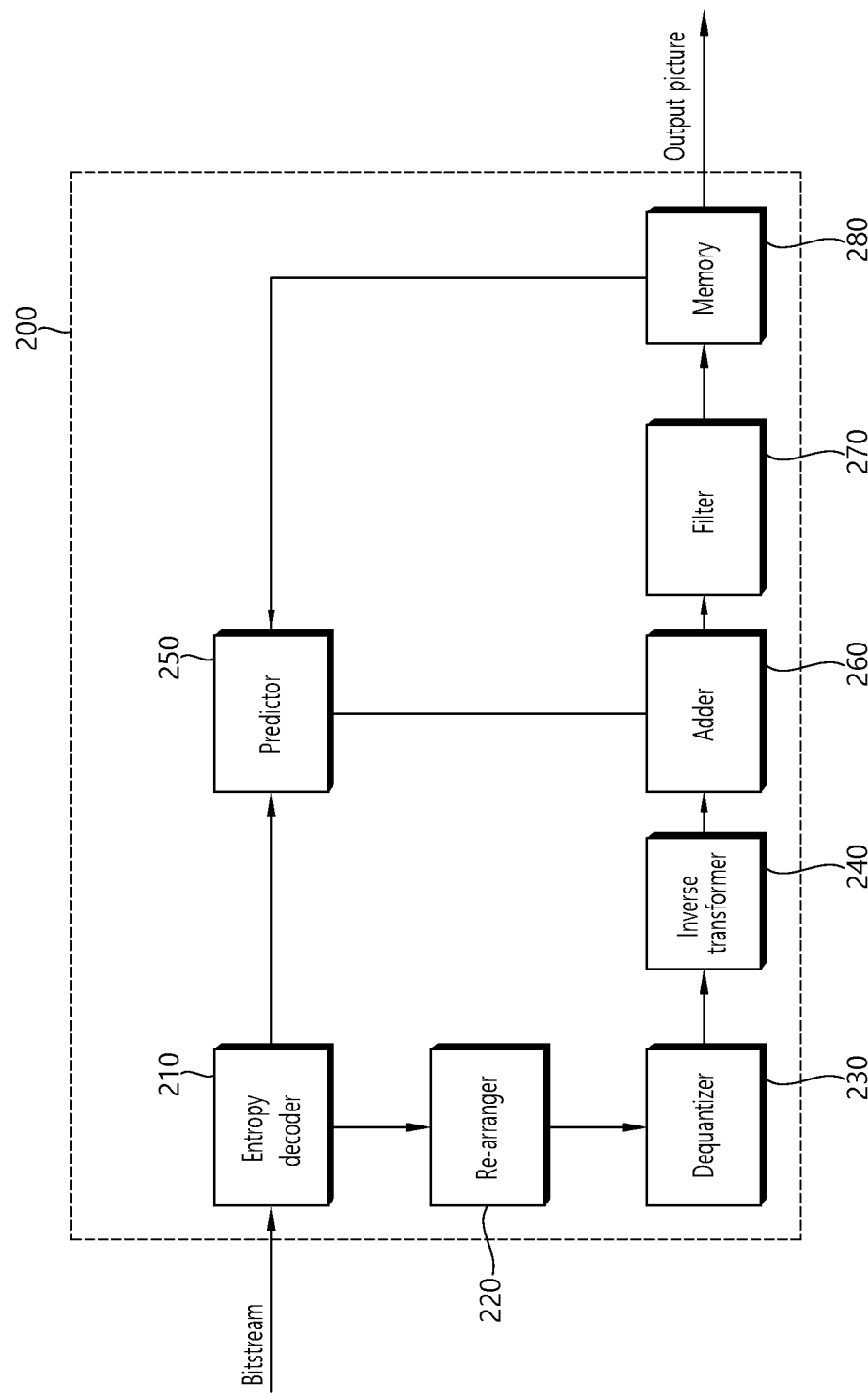
FIG. 2 is a block diagram schematically illustrating a video decoder according to an embodiment of the invention.

FIG. 2 is a block diagram schematically illustrating a video decoder according to an embodiment of the invention. Referring to FIG. 2, a video decoder 200 may include an entropy decoder 210, a re-arranger 215, a dequantizer 220, an inverse transformer 225, a predictor 230, a filter 235, and a memory 240.

When a video bitstream is input from the video encoder, the input bitstream may be decoded on the basis of the order in which video information is processed by the video encoder.

The entropy decoder 210 may entropy-decode the input bitstream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoder, the entropy decoder 210 may perform decoding using the same VLC table as the encoder used in the encoder. Further, when CABAC is used to perform entropy encoding in a video encoder, the entropy decoder 210 may perform the entropy decoding using CABAC.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoder 210 may be supplied to the predictor 230, and the residual values, that is, the quantized transform coefficients, entropy-decoded by the entropy decoder 210 may be input to the re-arranger 215.

The re-arranger 215 may rearrange the bitstream information, that is, the quantized transform coefficients, entropy-decoded by the entropy decoder 210 on the basis of the rearrangement method in the video encoder.

The re-arranger 215 may reconstruct and rearrange the coefficients expressed in the form of a one-dimensional vector into coefficients in the form of a two-dimensional block. The re-arranger 215 may scan the coefficients on the basis of the prediction mode applied to the current block transform block and the size of the transform block and may create an array of coefficients quantized transform coefficients in the form of a two-dimensional block.

The dequantizer 220 may perform dequantization on the basis of the quantization parameters supplied from the video encoder and the coefficient values of the rearranged block.

The inverse transformer 225 may perform the inverse DCT and/or inverse DST of the DCT and/or DST, which has been performed by the transformer of the video encoder, on the quantization result from the video encoder.

The inverse transform may be performed on the basis of a transfer unit or a partition unit of a picture determined by the video encoder. The transformer of the video encoder may selectively perform the DCT and/or DST depending on plural information pieces such as the prediction method, the size of a current block, and the prediction direction, and the inverse transformer 225 of the video decoder may perform the inverse transform on the basis of the transform information on the transform performed by the transformer of the video encoder.

The predictor 230 generates a prediction block including a prediction sample or a prediction sample array based on the prediction block generation-related information provided by the entropy decoder 210 and the previously decoded block and/or picture information provided from the memory 240.

If the prediction mode for the current PU is the intra prediction mode, the predictor 230 may perform the intra prediction to generate a prediction block based on pixel information in the current picture.

If the prediction mode for the current PU is the inter prediction mode, the predictor 230 may be configured to perform inter prediction on a current PU based on information included in at least one picture of a previous picture or a subsequent picture to the current picture. In this connection, information about the motion information necessary for inter prediction of the current PU provided in the video encoder, such as motion vector and reference picture index may be deduced via checking the skip flag and merge flag received from the encoder.

The predictor 230 may generate a prediction block such that the residual signal relative to the current block is minimized and the motion vector size is minimized when inter prediction is performed on the current picture.

On the other hand, the motion information derivation method may be changed according to the prediction mode of the current block. The prediction mode applied to inter prediction may include an Advanced Motion Vector Prediction (AMVP) mode, a merge mode, and the like.

In one example, when the merge mode is applied, the encoder and decoder may generate a merge candidate list using a motion vector for a reconstructed spatial neighboring block and/or is a motion vector corresponding to a Col block as a temporal neighboring block. In the merge mode, a motion vector of a candidate block selected from the merge candidate list is used as a motion vector of a current block. The encoder may transmit to the decoder a merge index indicating a candidate block having an optimal motion vector as selected from candidate blocks included in the merge candidate list. In this connection, the decoder may derive a motion vector for the current block using the merge index.

In another example, when the AMVP (Advanced Motion Vector Prediction) mode is applied, the encoder and decoder generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoder may transmit to the decoder a prediction motion vector index indicating the optimal motion vector selected from among the motion vector candidates included in the motion vector predictor candidate list. In this connection, the decoder may select the prediction motion vector for the current block from the motion vector candidates included in the motion vector candidate list using the motion vector index.

The encoder may obtain the motion vector difference MVD between the motion vector for the current block and the motion vector predictor, encode the MVD, and transmit the encoded MVD to the decoder. That is, the MVD may be a value obtained by subtracting the motion vector predictor (MVP) from the motion vector (MV) for the current block. In this connection, the decoder may decode the received motion vector difference, and derive the motion vector for the current block via addition between the decoded motion vector difference and the motion vector predictor.

Further, the encoder may transmit a reference picture index indicating a reference picture to the decoder.

The decoder may predict the motion vector of the current block using the motion information of the neighboring block and derive the motion vector of the current block using the residual received from the encoder. The decoder may generate the prediction block for the current block based on the derived motion vector and the reference picture index information received from the encoder.

In another example, when the merge mode is applied, the encoder and decoder may generate a merge candidate list using the motion information of the reconstructed neighboring block and/or the motion information of the Col block. That is, when the reconstructed neighboring block and/or the motion information of the Col block exists, the encoder and decoder may use the reconstructed neighboring block and/or the motion information of the Col block as a merge candidate for the current block.

The encoder may select a merge candidate that provides optimal encoding efficiency among the merge candidates included in the merge candidate list as the motion information for the current block. In this connection, a merge index indicating the selected merge candidate may be included in the bitstream which is transmitted to the decoder. The decoder may select one of the merge candidates included in the merge candidate list using the transmitted merge index, and the decoder may determine the selected merge candidate as motion information of the current block. Therefore, when the merge mode is applied, the motion information of the reconstructed neighboring block and/or the Col block may be used as the motion information for the current block as it is. The decoder may reconstruct the current block by adding the prediction block and the residual transmitted from the encoder to each other.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoder does not transmit syntax information such as the residual to the decoder in addition to information indicating which block's motion information to use as the motion information for the current block.

The encoder and the decoder may generate a prediction block of the current block by performing motion compensation on the current block based on the derived motion information. In this connection, a prediction block may refer to a motion-compensated block as generated by performing motion compensation on the current block. Further, a plurality of motion compensated blocks may constitute a single motion compensated image.

The reconstructed block may be generated using the prediction block generated by the predictor 230 and the residual block provided by the inverse-transformer 225. FIG. 2 illustrates that using the adder, the prediction block and the residual block are combined to generate the reconstructed block. In this connection, the adder may be viewed as a separate element (a reconstructed block generator) that is configured to generate the reconstructed block. In this connection, the reconstructed block includes a reconstructed sample or a reconstructed sample array as described above; the prediction block includes a prediction sample or a prediction sample array; the residual block may include a residual sample or a residual sample array. Therefore, the reconstructed sample or the reconstructed sample array can be considered to be generated by combining the corresponding prediction sample or prediction sample array with the corresponding residual sample or residual sample array.

For a block that the skip mode is applied, the residual signal may not be transmitted and the predicted block may be used as a reconstructed block.

The reconstructed block and/or picture may be supplied to the filter 235. The filter 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output module.

The elements that is directly related to decoding images among the entropy decoder 210, the re-arranger 215, the dequantizer 220, the inverse transformer 225, the predictor 230, the filter 235 and the memory 240 which are included in the video decoder 200, for example, the entropy decoder 210, the re-arranger 215, the dequantizer 220, the inverse transformer 225, the predictor 230, the filter 235, and so on may be expressed as a decoder or a decoding unit that is distinguished from other elements.

In addition, the video decoder 200 may further include a parsing unit not shown in the drawing that parses information related to the encoded images included in a bitstream. The parsing unit may include the entropy decoder 210, and may be included in the entropy decoder 210. Such a parsing unit may also be implemented as an element of the decoding unit.

An in-loop filter may be applied to the reconstructed picture to compensate for the difference between the original picture and the reconstructed picture due to errors occurring in the compression coding process including quantization. As described above, the in-loop filtering may be performed in the filter of the encoder and decoder. The filter may be configured to apply the deblocking filter, the sample adaptive offset (SAO) and/or the adaptive loop filter (ALF) to the reconstructed picture. When the filter is used, it is necessary to code information on the filter. When the side information for using the filter is large, the coding efficiency may be reduced or may be lowered due to the use of the filter. The filter information may indicate at least one of a type of the filter applied to the current block, a size and a filter coefficient of the filter.

A neighboring sample or neighboring block to the current block as previously decoded before decoding the current block and the current block have a large spatial similarity therebetween, so that the side information may be reduced or eliminated by using the above similarity. The present disclosure provides a method for deriving filter information using information on the neighboring block or neighboring sample.

Figure 3:
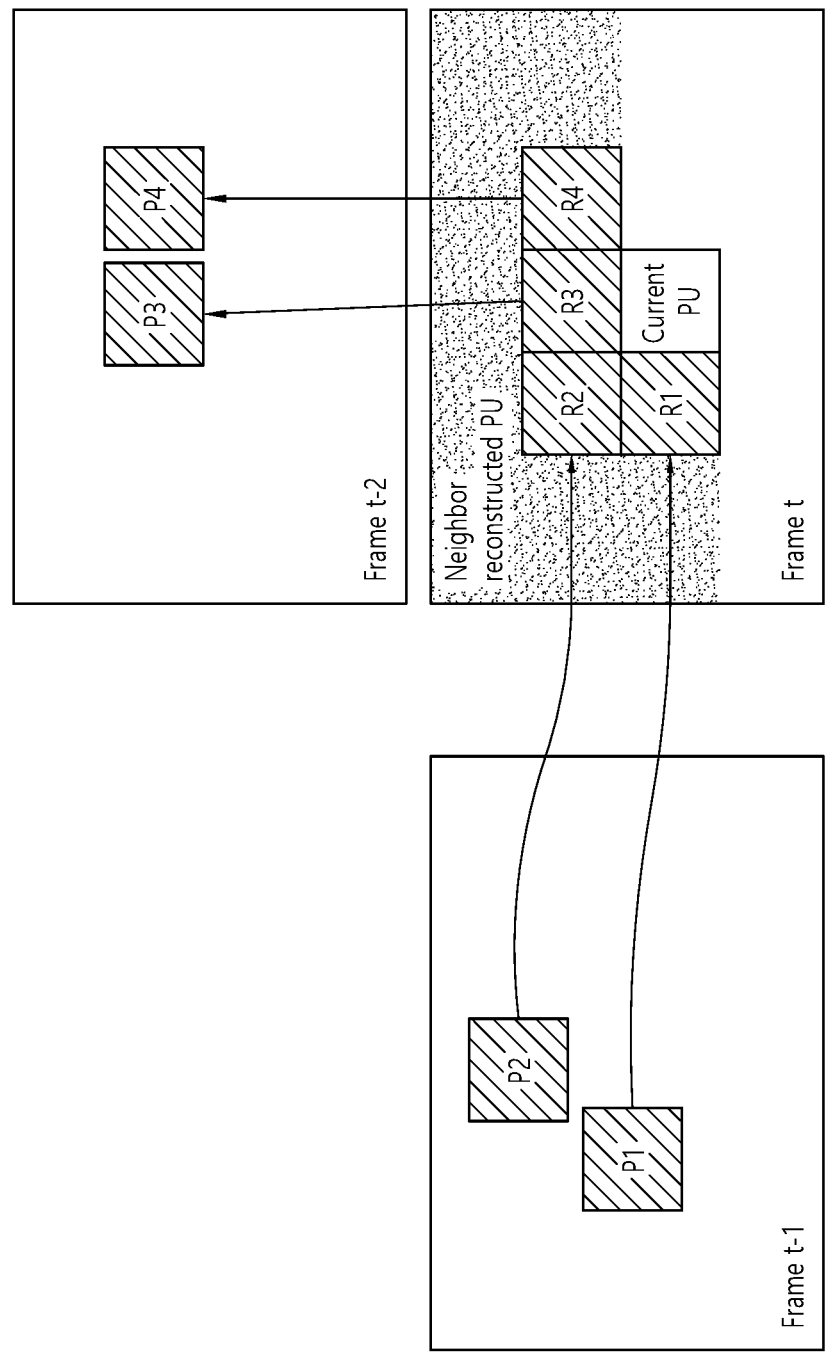
FIG. 3 shows an example of neighboring blocks already decoded before the decoding of the current block and the reference blocks for the neighboring blocks.

FIG. 3 shows an example of neighboring blocks already decoded before the decoding of the current block and the reference blocks for the neighboring blocks.

Referring to FIG. 3, a frame t represents the current frame or current picture, a frame t-1 and a frame t-2 represent previously decoded frames or decoded pictures. Referring to FIG. 3, the previously decoded neighboring blocks R1, R2, R3, and R4 in the current frame t correspond respectively to the reference blocks P1, P2, P3 and P4 in the reference frame t-1 and frame t-2. For example, the reference block Px may be a block indicated by the reference picture index and the motion vector of the neighboring block Rx. That is, the reference blocks P1, P2, P3 and P4 represent reference information about the previously decoded neighboring block R1, R2, R3, and R4, respectively. At least one block of the neighboring blocks may be derived as a specific neighboring block to the current block for filter information derivation for the current block. Filter information for the specific neighboring block may be derived via a comparison between reconstructed samples of the specific neighboring block and reconstructed samples of the reference block for the specific neighboring block. The filter information for the current block may be derived based on the filter information about the specific neighboring block.

Although FIG. 3 shows, as the neighboring blocks to the current block, the left neighboring block R1, the upper-left neighboring block R2, the upper neighboring block R3, and the upper-right neighboring block R4, this is merely an example. In addition, a lower-left neighboring block R0 may be included in neighboring blocks to the current block. In this case, a reference block P0 on a previous any frame or picture corresponding to the lower-left neighboring block R0 may be further used for filter information derivation for the current block. The same applies to the following.

In one example of a method for deriving the specific neighboring block in a decoding process, the decoder may derive a candidate list for filter information derivation for the current block based on neighboring blocks to the current block. The decoder may select the specific candidate from the candidate list. The specific neighboring block may be included in the specific candidate. The candidate list may include a combination of a plurality of the neighboring blocks. Specifically, the decoder may derive the candidate list including the upper neighboring block, the left neighboring block, the upper-left neighboring block, the upper-right neighboring block, and the combination of neighboring blocks, to the current block.

In one example of a method for selecting the specific neighboring block from the candidate list, the decoder may derive a block having an arbitrary position, specifically, a left neighboring block R1 as the specific neighboring block. In this connection, when the left neighboring block is unavailable, another neighboring block adjacent to the left neighboring block as included in the candidate list may be derived as the specific neighboring block. The availability determination of the neighboring block will be described later.

In another example, the decoder may determine the availability of the neighboring blocks included in the candidate list based on their priorities, and derive the specific neighboring block based on the availability. The availability determination of the neighboring block will be described later. Specifically, the decoder sequentially checks the priorities of the left neighboring block R1, the upper neighboring block R3, the upper-left neighboring block R2, and the upper-right neighboring block R4 shown in FIG. 3 and determines the availability of the neighboring blocks based on their priorities. Alternatively, the decoder may prioritize the blocking in a clockwise or counterclockwise manner around a current block, and may perform availability determination according to the priority order. When determining the availability of candidate blocks based on the order of priority, the neighboring block determined to be first available may be derivable as the specific neighboring block. Alternatively, the decoder may derive all of the neighboring blocks determined to be available as the specific neighboring blocks. The availability determination for the neighboring block will be described later.

In another example, the decoder may derive the candidate list based on the neighboring blocks. The decoder selects one candidate from the candidate list based on a filter index obtained from the bitstream from the candidate list. The decoder may derive the specific neighboring block based on the candidate. In addition, the candidate list may contain a combination of neighboring blocks as available. The candidate list may be as shown in Table 1 below.

TABLE 1

| index | Candidate list |
|---|---|
| 0 | R1 |
| 1 | R2 |
| 2 | R3 |
| 3 | R4 |
| 4 | R1 + R2 |
| 5 | R1 + R2 + R3 |
| 6 | R1 + R2 + R3 + R4 |
| 7 | R3 + R4 |

In this connection, R1, R2, R3, and R4 represent neighboring blocks for the current block, as shown in FIG. 3. If the index value is 4 to 7, the decoder may derive a combination of available neighboring blocks as the specific neighboring block. The decoder may further add neighboring blocks available in addition to the neighboring blocks shown in Table 1 to the candidate list. Furthermore, the decoder may further add to the candidate list a combination of available neighboring blocks, such as candidates with an index value of 4 to 7 in Table 1 above.

The availability check to determine whether a neighboring candidate block is eligible may be performed based on at least one of the following conditions:

If there is a neighboring candidate block, the availability check is applied. For example, if the location of the neighboring candidate block is in the picture and/or slice, the corresponding neighboring candidate block must be a block that may be referenced in terms of coding order. For example, the case when a neighboring candidate block is not available may include following cases: when the location of the corresponding neighboring block is located outside the current picture (for example, when the current block is located adjacent to the left boundary of the current picture, the upper-left neighboring block or the lower-left neighboring block to the current block may be determined not to be available) or alternatively, when the corresponding neighboring block is located on a slice or tile that is different from that of the current block. In this connection, the slice may be a sequence of integer CTUs. The CTUs within the slice may be included in one independent slice segment and subsequent dependent slice segments. The tile is a rectangular region containing CTU (CTB)s. The rectangular region may be identified based on the specific tile column and the specific tile row in the picture.

The availability check is applied when the candidate block is coded in an inter mode. This is because that when the neighboring candidate block is coded in the intra prediction mode, and, thus, a reference block of the neighboring candidate block cannot exist, and, thus, the filter information for the neighboring candidate block cannot be derived via comparison between the reconstructed samples of the neighboring candidate block and the reconstructed samples of the reference block.

Figure 4:
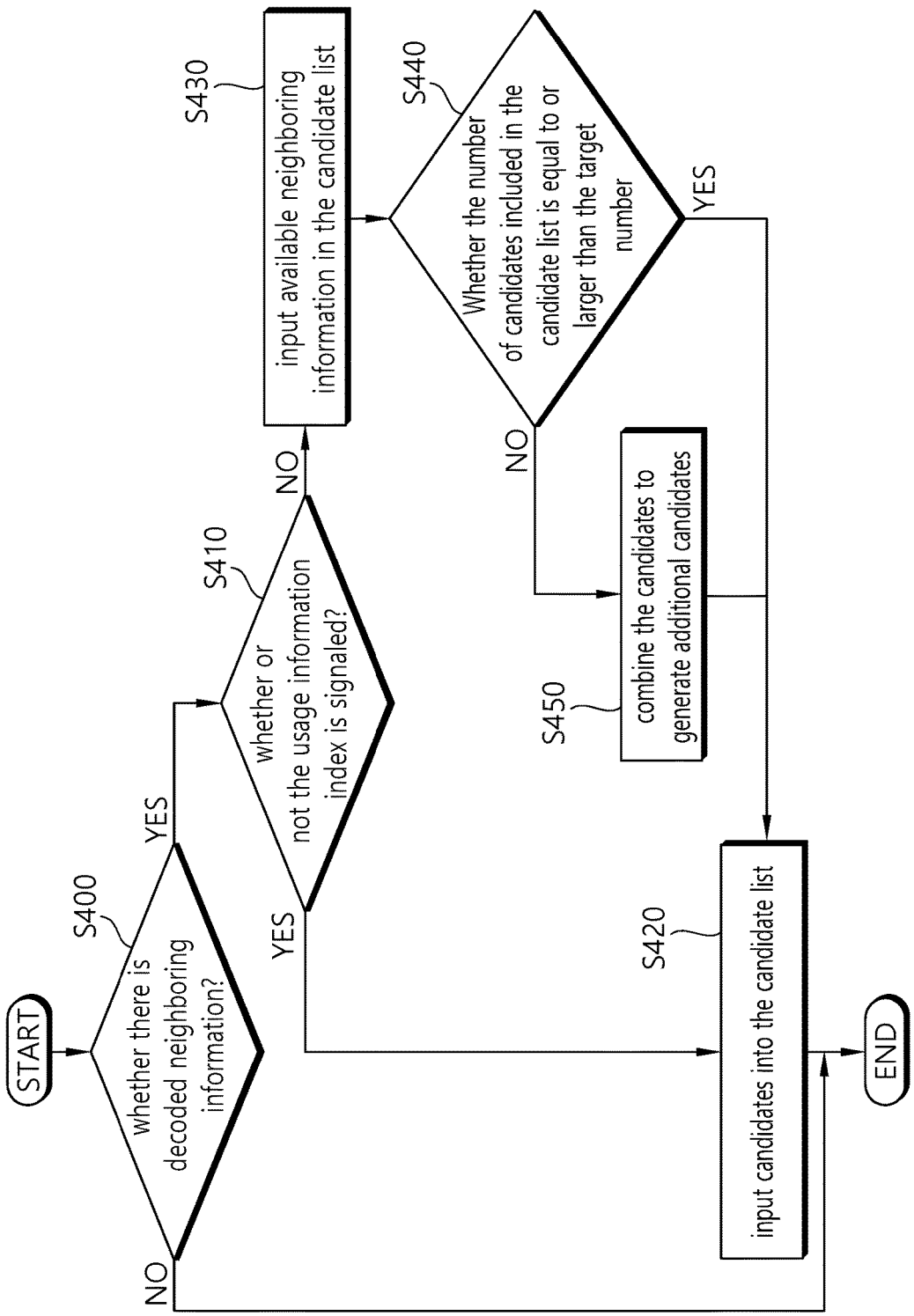
FIG. 4 shows an exemplary method for constructing a candidate list for the filter information derivation for the current block.

FIG. 4 shows an example method for constructing a candidate list for filter information derivation for the current block. Referring to FIG. 4, the decoder may construct the candidate list according to the flowchart shown in FIG. 4. The decoder may determine whether there is a decoded neighboring block or neighboring sample to the current block. If the decoded neighboring block or neighboring sample to the current block do not exist, the decoder may not construct the candidate list. When the decoded neighboring block or neighboring sample to the current block is present, the decoder may determine whether or not the index information on the usage information of the neighboring region has been obtained using the bit stream S410. If the usage information is obtained, the decoder may generate candidates based on the usage information and input the generated candidates into the candidate list S420. However, if the usage information is not obtained, the decoder may generate candidates based on neighboring available decoded information and input the generated candidates in the candidate list in operation S430. After inputting the decoded information to the candidate list, the decoder compares the number of candidates included in the candidate list with a predetermined number. If the number of candidates included in the candidate list is smaller than the preset number, the decoder may combine the candidates to generate additional candidates, and may add the generated additional candidates to the candidate list S450. To the contrary, if the number of candidates included in the candidate list is equal to or greater than the predetermined number, the decoder may use the candidate list derived according to the above process to derive the filter information for the current block.

Meanwhile, the type of the filter for the current block is not fixed to one type. Rather, in the decoding process, one of a plurality of filters may be selectively used as a filter for the current block. That is, the decoder may derive a candidate list including types of a plurality of filters, and the decoder may select the specific candidate from the candidate list and select the type of filter for the current block.

Figure 5:
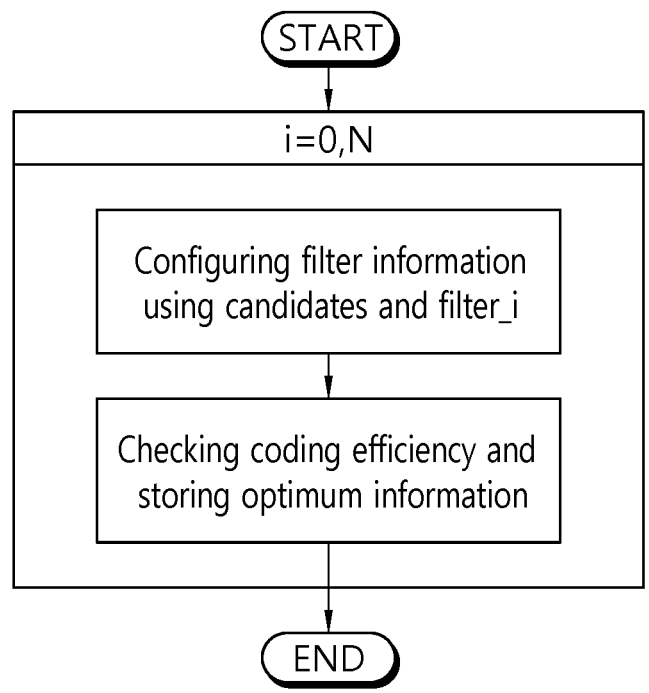
FIG. 5 shows an example of a method for selecting a filter for a current block among a plurality of filters.

FIG. 5 shows an example of a method for selecting a filter for a current block among a plurality of filters. Referring to FIG. 5, the decoder may construct a candidate list including N+1 types of filters. The decoder may select one specific candidate from the candidate list and derive the type of the filter for the current block. The candidate list may include N+1 types of filters. In this connection, the filters may include filters having a number of features, including a high pass filter, a low pass filter, a Wiener filter, and a de-ringing filter, etc. The value of the index information indicating the filters may be represented by i. i may be represented by 0 to N.

In the encoding process, the encoder may derive an optimal filter by comparing performances of the N+1 types of filters. The encoder may perform filtering on the current block using each filter. The encoder may verify the efficiency of the filtering by the filters and compare the efficiencies thereof with each other, thereby deriving the optimal filter. The encoder may store the optimal information, i.e. the information of the derived filter. The information of the derived filter may vary depending on the type of the filter. In one example, when the derived filter is a Wiener filter, the size, coefficient information, etc. of the filter may be stored. The decoder may use the bitstream to obtain index information indicating the derived filter. The filter indicated by the index information in the candidate list may be derived as a filter for the current block.

Alternatively, previously decoded neighboring samples to the current block may be used for filter information derivation for the current block.

Figure 6:
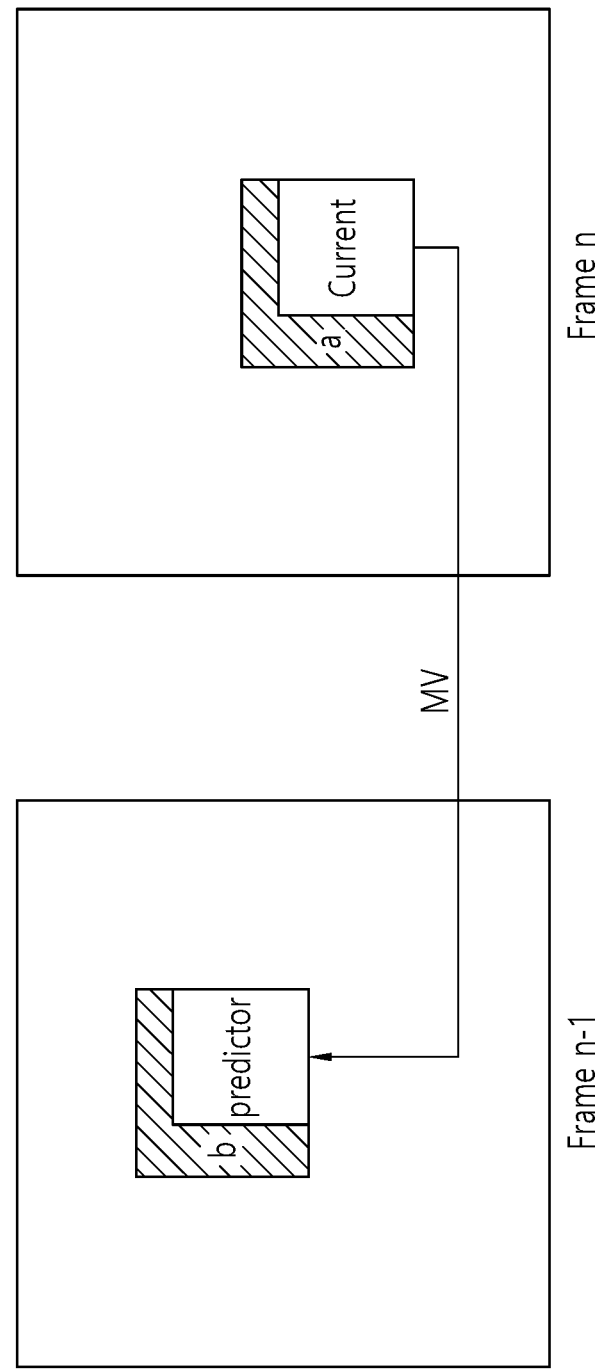
FIG. 6 shows an exemplary method using previously decoded neighboring samples to the current block.

FIG. 6 shows an example of a method using previously decoded neighboring samples to the current block. Referring to FIG. 6, information of neighboring samples to the current block may be used for filter information derivation for the current block. Specifically, the previously decoded neighboring samples (FIG. 6a) to the current block prior to decoding the current block may be derived as the first neighboring samples to the current block for filter information derivation for the current block. A motion vector for the current block may be derived based on the neighboring block to the current block. Based on the motion vector, a reference block on the reference picture is derived. The second neighboring samples of the reference block (FIG. 6b) may be derived based on the reference block. Filter information for the current block may be derived based on the first neighboring samples and the second neighboring samples.

Figure 7:
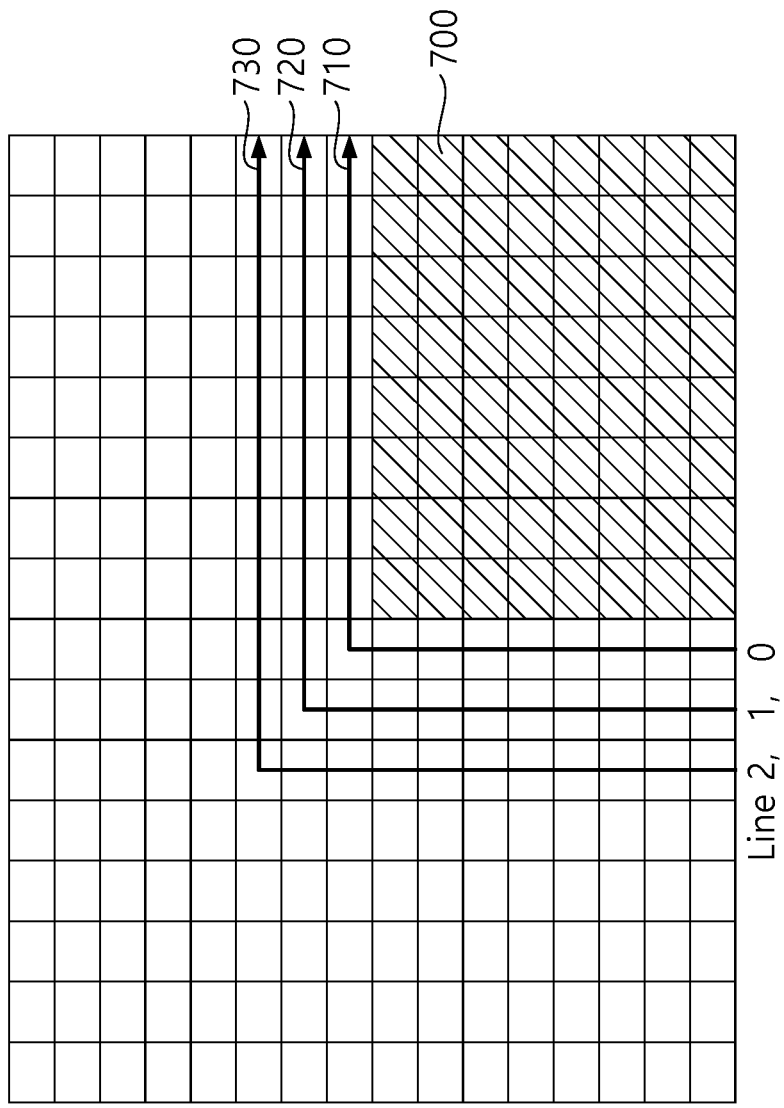
FIG. 7 illustrates the locations of the first neighboring samples for the filter information derivation for the current block.

FIG. 7 provides an example of the location of the first neighboring samples for filter information derivation for the current block. In FIG. 7, the current block 700 may be represented as a hatched region. The neighboring samples located at a distance from the current block 700 may have a lower correlation with the current block 700. Therefore, the neighboring samples located closer to the current block 700 may be derived as the first neighboring samples to the current block 700. The filter information for the current block 700 may be derived based on the first neighboring samples and the second neighboring samples on the reference picture corresponding to the first neighboring samples. Specifically, the decoder may derive neighboring samples 710 located on line 0, as shown in FIG. 7, as the first neighboring samples. The decoder may derive information on a filter for the current block 700 based on the first neighboring samples and the second neighboring samples corresponding to the first neighboring samples. Alternatively, the decoder may derive neighboring samples 710 located on line 0 and neighboring samples 720 located on line 1, as shown in FIG. 7, as the first neighboring samples. Alternatively, the decoder may derive neighboring samples 710 located on line 0, neighboring samples 720 located on line 1, and neighboring samples 730 located on line 2 as the first neighboring samples. The locations of the neighboring samples derived as the first neighboring samples may be defined in advance. Information on the location of neighboring samples derived as the first neighboring samples may be coded and transmitted at a prediction unit, coding unit, slice, picture, or sequence level.

Figure 8:
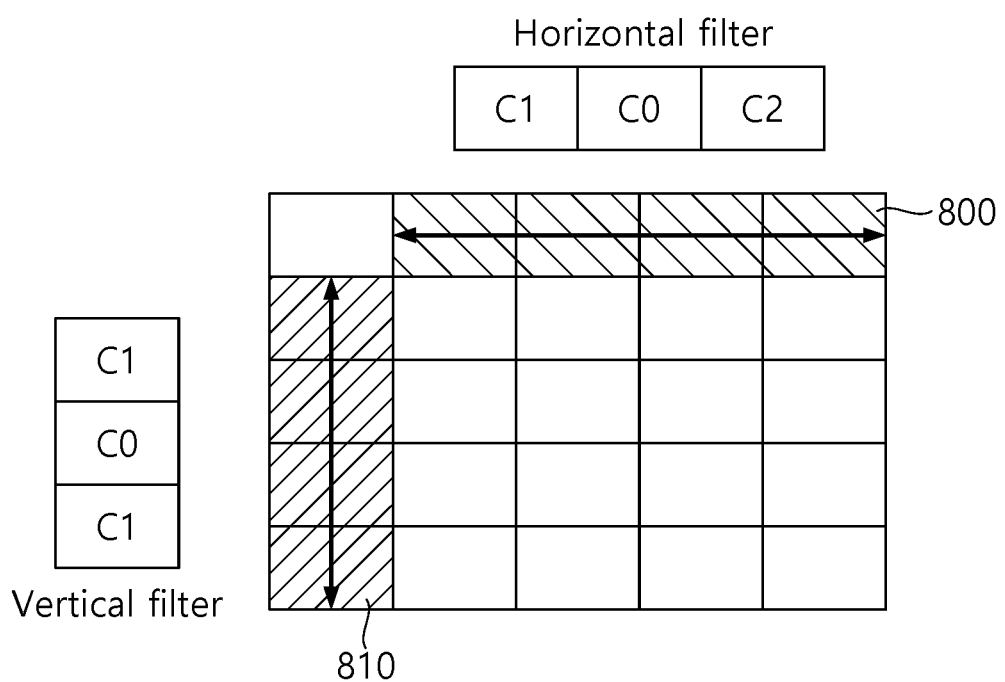
FIG. 8 shows an exemplary filter based on the directionality of the first neighboring samples to the current block.

FIG. 8 shows an exemplary filter based on the orientation of the first neighboring samples to the current block. FIG. 8 illustratively illustrates that the first neighboring samples to the current block include the first upper neighboring samples 800 and the first left neighboring samples 810. Referring to FIG. 8, the decoder may generate a horizontal direction filter based on the first upper neighboring samples 800 to the current block, having continuous locations in the horizontal direction and the second upper neighboring samples on the reference picture corresponding to the first upper neighboring samples 800. The decoder may generate a vertical direction filter based on the first left neighboring samples 810 to the current block, having locations that are consecutive in the vertical direction, and the second left neighboring samples in the reference picture corresponding to the first left neighboring samples 810. The decoder may obtain a vertical feature based on the first left neighboring samples 810 and the second left neighboring samples. The decoder may obtain a horizontal feature based on the first upper neighboring samples 800 and the second upper neighboring samples. Thus, the decoder may generate a vertical filter based on the first left neighboring samples 810 and the second left neighboring samples. The decoder may generate a horizontal filter based on the first upper neighboring samples 800 and the second upper neighboring samples. The filter for the current block may be derived as one of the filters in the vertical direction and the filters in the horizontal direction. Alternatively, the filter for the current block may be derived as a combination of the vertical filter and the horizontal filter. The combination of the vertical filter and the horizontal filter, the vertical filter, and the horizontal filter may be included in the candidate list. These details may be predefined between the encoder and the decoder. The information thereof may be coded and transmitted at a prediction unit, coding unit, slice, picture, or sequence level. If both the vertical filter and the horizontal filter are applied, the application order of the filters may be predefined between the encoder and the decoder. The information thereof may be coded at a prediction unit, coding unit, slice, picture, or sequence level.

Meanwhile, the filter information on the current block may be derived by applying a mathematical formula to the information on the specific neighboring block or the first neighboring samples to the current block and the reference block or the second neighboring samples for the specific neighboring block. In this case, the values of the reconstructed samples of the specific neighboring block or the first neighboring samples, and the values of the reconstructed samples or the second neighboring samples of the reference block may be applied to the above mathematical formula. The filter coefficient in the filter information may be derived based on the following mathematical formula:

$$E[(R1-C*P1)]^2 \qquad \text{[Mathematical formula 1]}$$

In this connection, C represents the filter coefficient of the filter for the current block. R1 represents the specific neighboring block or the first neighboring samples. P1 represents the reference block or the second neighboring samples. E is the expectation function to obtain the value of parameter C when the value of the mathematical formula is the minimum value. According to the mathematical formula 1, C that minimizes the square of the difference between R1 and C*P1 may be obtained.

Figure 9:
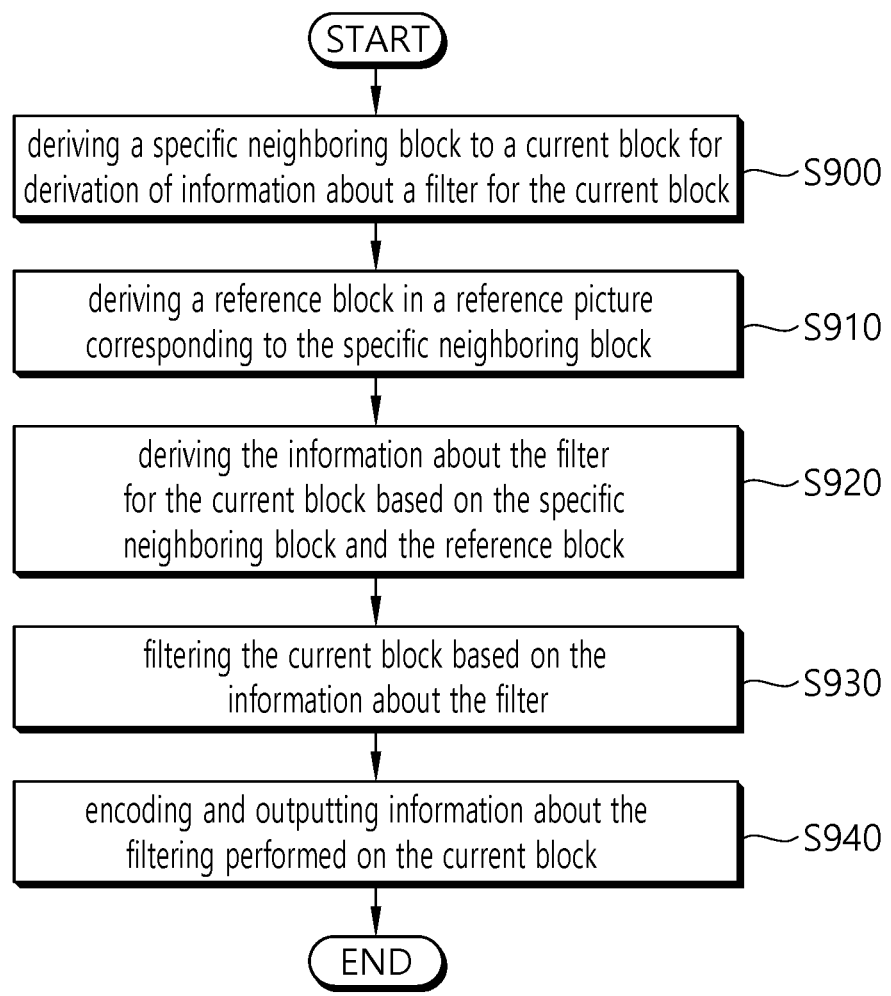
FIG. 9 outlines the filtering method by the encoding device according to the present disclosure.

FIG. 9 shows an overview of the encoder-based filtering method according to the present disclosure. The method described in FIG. 9 may also be performed by the encoder described in FIG. 1. Specifically, for example, S900 to S930 of FIG. 9 may be performed by the filter of the encoder, and S940 may be performed by the entropy encoder of the encoder.

The encoder determines the specific neighboring block to the current block for filter information derivation for the current block S900. The encoder may derive a candidate list for filter information derivation for the current block based on neighboring blocks to the current block. The encoder may select the specific candidate from the candidate list. The specific neighboring block may be included in the specific candidate. The candidate list may include a combination of a plurality of the neighboring blocks. Specifically, the encoder may derive the candidate list including the upper neighboring block, the left neighboring block, the upper-left neighboring block, the upper-right neighboring block, and the combination of neighboring blocks, to the current block. The candidate list may be as shown in Table 1. The candidate list may also be constructed according to the method in FIG. 4.

In one example of a method for selecting the specific neighboring block from the candidate list, the encoder may derive a block having an arbitrary position, specifically, a left neighboring block as the specific neighboring block. In this connection, when the left neighboring block is unavailable, another neighboring block adjacent to the left neighboring block as included in the candidate list may be derived as the specific neighboring block. The availability determination of the neighboring block will be described later.

In another example, the encoder may determine the availability of the neighboring blocks included in the candidate list based on their priorities, and derive the specific neighboring block based on the availability. Specifically, the encoder sequentially checks the priorities of the left neighboring block, the upper neighboring block, the upper-left neighboring block, and the upper-right neighboring block, and determines the availability of the neighboring blocks based on their priorities. Alternatively, the encoder may prioritize the blocking in a clockwise or counterclockwise manner around a current block, and may perform availability determination according to the priority order. When determining the availability of candidate blocks based on the order of priority, the neighboring block determined to be first available may be derivable as the specific neighboring block. Alternatively, the encoder may derive all of the neighboring blocks determined to be available as the specific neighboring blocks.

Meanwhile, the encoder may generate filter index information indicating a specific candidate from the candidate list. A candidate having an index value corresponding to the value of the filter index may include the specific neighboring block.

The encoder derives the specific neighboring block and a reference block on the reference picture corresponding to the specific neighboring block in operation S910. The encoder may derive a reference block on the reference picture indicated by the motion vector of the specific neighboring block.

The encoder derives the filter information for the current block based on the specific neighboring block and the reference block S920. The filter information may be different depending on the type of the filter. Specifically, when the derived filter is a Wiener filter, the filter information may include size, coefficient information, etc. of the filter. The filter information for the current block may be derived based on the information about the specific neighboring block to the current block and the reference block for the specific neighboring block. Specifically, the filter information for the current block may be derived based on values of the reconstructed samples of the specific neighboring block, and values of the reconstructed samples of the reference block. In this case, the filter coefficient in the information of the filter may be derived based on the mathematical formula 1 as described above.

Meanwhile, the type of the filter for the current block is not fixed to one type. Rather, in the encoding process, one of a plurality of filters may be selectively used as a filter for the current block. That is, the encoder may derive a candidate list including types of a plurality of filters, and the encoder may select the specific candidate from the candidate list and select the type of filter for the current block. The encoder may construct a candidate list including N+1 types of filters. The encoder may select one specific candidate from the candidate list and derive the type of the filter for the current block. The candidate list may include N+1 types of filters. In this connection, the filters may include filters having a number of features, including a high pass filter, a low pass filter, a Wiener filter, and a de-ringing filter, etc. In the encoding process, the encoder may derive an optimal filter by comparing performances of the N+1 types of filters. The encoder may perform filtering on the current block using each filter. The encoder may verify the efficiency of the filtering by the filters and compare the efficiencies thereof with each other, thereby deriving the optimal filter. The encoder may store the optimal information, i.e. the information of the derived filter. The information of the derived filter may vary depending on the type of the filter. In one example, when the derived filter is a Wiener filter, the size, coefficient information, etc. of the filter may be stored.

The encoder may use the bitstream to obtain index information indicating the derived filter. The filter indicated by the index information in the candidate list may be derived as a filter for the current block. The value of the index information indicating the filters may be represented by i. i may be represented by 0 to N.

The encoder performs filtering on the current block based on the filter information (S930). Filtering for the current block may be applied to reconstructed samples for the current block. That is, the encoder generates predicted samples of the current block based on intra prediction or inter prediction. The encoder may generate the reconstructed samples of the current block by adding residual samples to the predicted samples of the current block. Filtering of the current block may be applied to the reconstructed samples thereof. Thus, the objective/subjective visual quality of the reconstructed picture can be improved. The residual samples may be generated based on the original samples of the original picture and the predicted samples.

The encoder encodes and outputs information about the filtering performed on the current block S940. The encoder may generate filter index information indicating a specific candidate in the candidate list, and may encode the information to output the information in the form of a bit stream. In addition, the encoder may generate filter index information indicating a filter candidate included in the candidate list, encode the information, and output the information in the form of the bit stream. The bits stream may be transmitted to the decoder over a network or using a storage medium.

Although not shown, the encoder may encode and output information about the residual sample of the current block. The information about the residual sample may include transform coefficients related to the residual sample.

Figure 10:
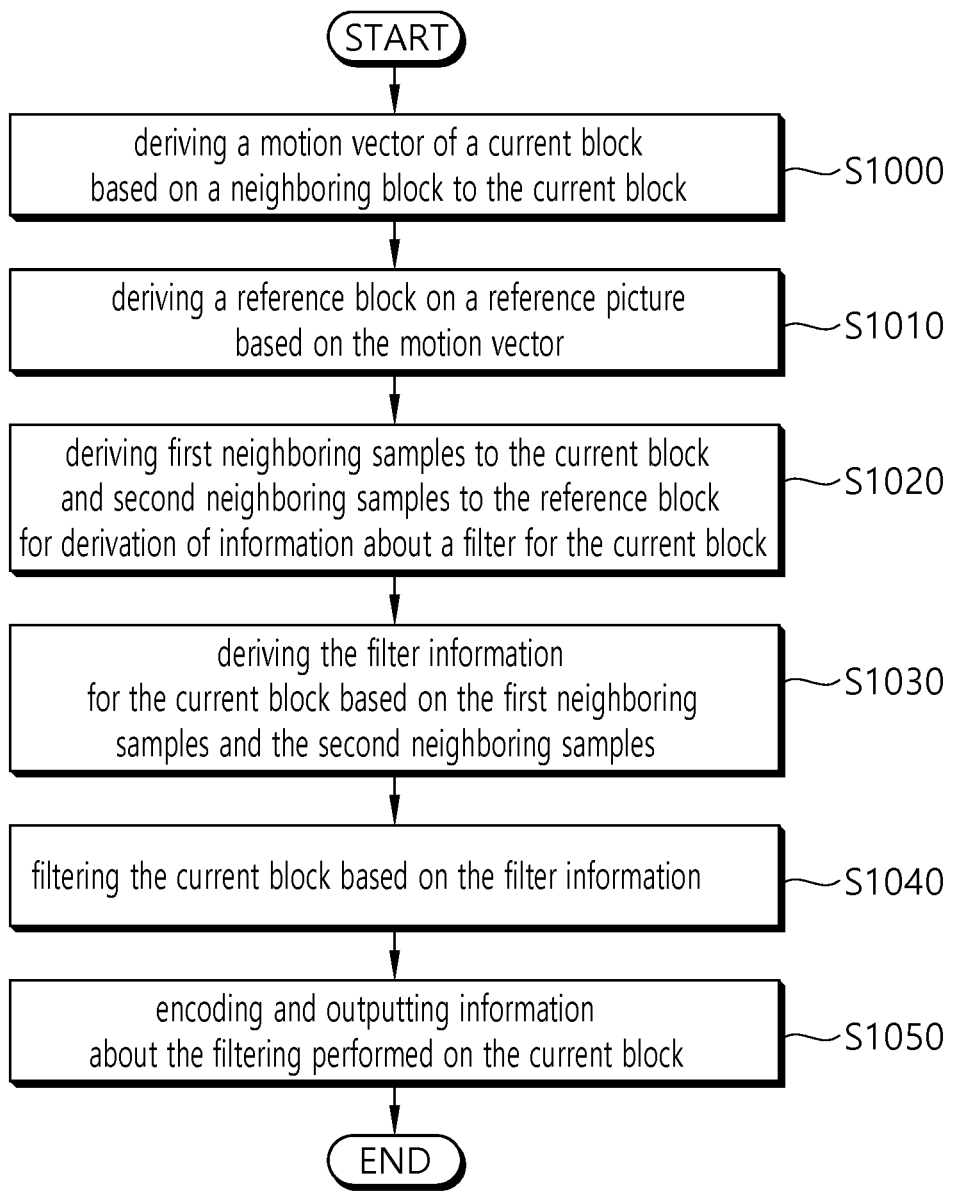
FIG. 10 schematically shows the filtering method by the encoding device according to the present disclosure.

FIG. 10 schematically shows the encoder-based filtering method according to the present disclosure. The method described in FIG. 10 may also be performed by the encoder described in FIG. 1. More specifically, for example, S1000 to S1010 of FIG. 10 may be performed by the predictor of the encoder, and S1020 to S1040 may be performed by the filter of the encoder, and S1050 may be performed by the entropy encoder thereof.

The encoder derives a motion vector for the current block based on a neighboring block to the current block S1000. In this case, the encoder determines whether inter prediction is applied to the current block. If inter prediction is applied to the current block, it may be determined whether the merge mode or the AMVP mode is applied as the inter prediction mode. The encoder may derive an optimal motion vector for the current block based on motion estimation and the like.

The encoder derives a reference block on the reference picture based on the motion vector (S1010). The encoder may derive the reference block corresponding to the current block having a location on the reference picture, indicated by the derived motion vector for the current block.

The encoder determines the first neighboring samples to the current block and the second neighboring samples to the reference block for filter information derivation for the current block (S1020). The encoder may determine the neighboring samples to the current block as the first neighboring samples to the current block for the filter information derivation for the current block. Further, the encoder may determine the neighboring samples to the reference block corresponding to the first neighboring samples as the second neighboring samples.

In one embodiment, when the coordinate of the top-left sample position for the current block is (0, 0) and the width and height of the current block are W and H, respectively, the encoder may determine the first neighboring samples including a top-left neighboring sample with (−1, −1) coordinate, upper neighboring samples with (0, −1) to (W−1,−1), and left neighboring samples with (−1, 0) to (−1, H−1). The encoder may determine the neighboring samples to the reference block corresponding to the neighboring samples as the second neighboring samples.

In another embodiment, when the coordinate of the top-left sample position for the current block is (0, 0) and the width and height of the current block are W and H, respectively, the encoder may determine the first neighboring samples including a top-left neighboring sample with (−1, −1) coordinate, upper neighboring samples with (0, −1) to (W−1,−1), left neighboring samples with (−1, 0) to (−1, H−1), a top-left neighboring sample with (−2, −2) coordinates, upper neighboring samples with (0, −2) to (W−1, −2) coordinates, and left neighboring samples with (−2, 0) to (−2, H−1) coordinates. The encoder may determine the neighboring samples to the reference block corresponding to the neighboring samples as the second neighboring samples.

The encoder derives filter information for the current block based on the first neighboring samples and the second neighboring samples (S1130). The filter information may be vary depending on the type of the filter. Specifically, when the derived filter is a Wiener filter, the filter information may include size, coefficient information, etc. of the filter. The filter information about the current block may be derived based on information about the first neighboring samples and information about the second neighboring samples. Specifically, the filter information may be derived based on values of reconstructed samples of the first neighboring samples and values of reconstructed samples of the second neighboring samples. In this case, the filter coefficient in the information about the filter may be derived based on the mathematical formula 1 as described above.

Meanwhile, the type of the filter for the current block is not fixed to one type. Rather, in the encoding process, one of a plurality of filters may be selectively used as a filter for the current block. That is, the encoder may derive a candidate list including types of a plurality of filters, and the encoder may select the specific candidate from the candidate list and select the type of filter for the current block. The encoder may construct a candidate list including N+1 types of filters. The encoder may select one specific candidate from the candidate list and derive the type of the filter for the current block. The candidate list may include N+1 types of filters. In this connection, the filters may include filters having a number of features, including a high pass filter, a low pass filter, a Wiener filter, and a de-ringing filter, etc. In the encoding process, the encoder may derive an optimal filter by comparing performances of the N+1 types of filters. The encoder may perform filtering on the current block using each filter. The encoder may verify the efficiency of the filtering by the filters and compare the efficiencies thereof with each other, thereby deriving the optimal filter. The encoder may store the optimal information, i.e. the information of the derived filter. The information of the derived filter may vary depending on the type of the filter. In one example, when the derived filter is a Wiener filter, the size, coefficient information, etc. of the filter may be stored.

Furthermore, the encoder may derive horizontal filter information based on the first upper neighboring samples and the second upper neighboring samples. The encoder may derive vertical filter information based on the first left neighboring samples and the second left neighboring samples. The first neighboring samples may include the first upper neighboring samples and the first left neighboring samples to the current block. The second neighboring samples may include the second upper neighboring samples and the second left neighboring samples to the reference block.

In addition, the encoder may generate filter index information indicating the filters in the candidate list. The value of the filter index information may be represented by i. The i may be represented by 0 to N.

The encoder performs filtering on the current block based on the filter information. The encoder may generate predicted samples for the current block. The encoder may generate reconstructed samples for the current block based on the predicted samples. Filtering for the current block may be applied to reconstructed samples for the current block. That is, the encoder generates predicted samples for the current block based on intra prediction or inter prediction. The encoder may generate reconstructed samples for the current block by adding residual samples to the predicted samples for the current block. Filtering for the current block may be applied to the reconstructed samples. This may improve the objective/subjective visual quality of the reconstructed picture. The residual samples may be generated based on the original samples of the original picture and the predicted samples.

The encoder encodes and outputs information about the filtering performed on the current block S1050. The encoder may generate filter index information indicating a specific candidate in the candidate list, and may encode the information to output the information in the form of a bit stream. In addition, the encoder may generate filter index information indicating a filter candidate included in the candidate list, encode the information, and output the information in the form of the bit stream. The bits stream may be transmitted to the decoder over a network or using a storage medium.

Although not shown, the encoder may encode and output information about the residual sample of the current block. The information about the residual sample may include transform coefficients related to the residual sample.

Figure 11:
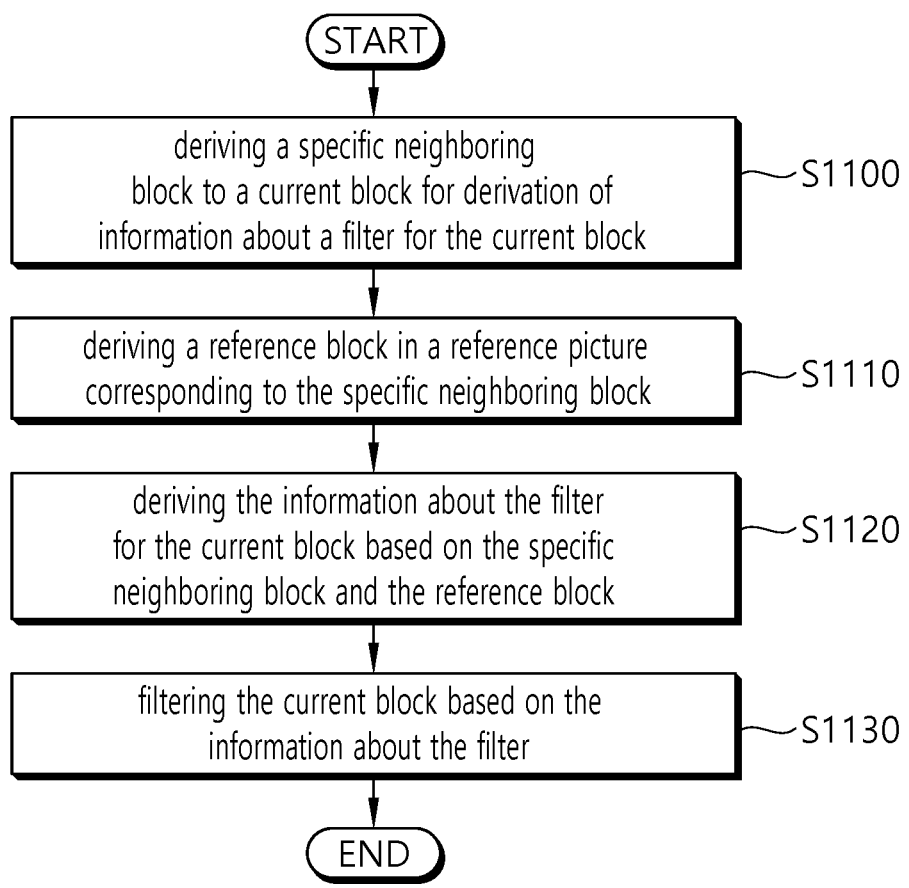
FIG. 11 schematically shows the filtering method by the decoding device according to the present disclosure.

FIG. 11 schematically shows the decoder-based filtering method according to the present disclosure. The method as described in FIG. 11 may also be performed by the decoder described in FIG. 2. More specifically, for example, S1100 to S1130 of FIG. 11 may be performed by the filter of the decoder.

The decoder derives the specific neighboring block to the current block for filter information derivation for the current block S1100. The decoder may derive a candidate list based on neighboring blocks to the current block for filter information derivation for the current block. The decoder may derive the specific candidate from the candidate list. The specific neighboring block may be included in the specific candidate. The candidate list may include a combination of a plurality of neighboring blocks. Specifically, the decoder may derive the candidate list including an upper neighboring block, a left neighboring block, an upper-left neighboring block, an upper-right neighboring block, and a combination of the neighboring blocks to the current block. The candidate list may be as shown in Table 1 above. The candidate list may be constructed according to the method in FIG. 4.

In one example of a method for selecting the specific neighboring block from the candidate list, the decoder may derive a block having an arbitrary position, specifically, a left neighboring block as the specific neighboring block. In this connection, when the left neighboring block is unavailable, another neighboring block adjacent to the left neighboring block as included in the candidate list may be derived as the specific neighboring block.

In another example, the decoder may determine the availability of the neighboring blocks included in the candidate list based on their priorities, and derive the specific neighboring block based on the availability. Specifically, the decoder sequentially checks the priorities of the left neighboring block, the upper neighboring block, the upper-left neighboring block, and the upper-right neighboring block, and determines the availability of the neighboring blocks based on their priorities. Alternatively, the decoder may prioritize the blocking in a clockwise or counterclockwise manner around a current block, and may perform availability determination according to the priority order. When determining the availability of candidate blocks based on the order of priority, the neighboring block determined to be first available may be derived as the specific neighboring block. Alternatively, the decoder may derive all of the neighboring blocks determined to be available as the specific neighboring blocks.

In another example, the decoder may derive the candidate list based on the neighboring blocks. The decoder selects one candidate from the candidate list based on a filter index obtained from the bitstream from the candidate list. The decoder may derive the specific neighboring block based on the candidate. In addition, the candidate list may contain a combination of neighboring blocks as available. The candidate list may be as shown in the above Table 1.

The decoder may further add neighboring blocks available in addition to the neighboring blocks shown in the Table 1 to the candidate list. Furthermore, the decoder may further add to the candidate list a combination of available neighboring blocks.

The decoder derives the specific neighboring block and a reference block on the reference picture corresponding to the specific neighboring block in operation S1110. The decoder may derive a reference block on the reference picture indicated by the motion vector of the specific neighboring block.

The decoder derives the filter information for the current block based on the specific neighboring block and the reference block S1120. The filter information may be different depending on the type of the filter. Specifically, when the derived filter is a Wiener filter, the filter information may include size, coefficient information, etc. of the filter. The filter information for the current block may be derived based on the information about the specific neighboring block to the current block and the reference block for the specific neighboring block. Specifically, the filter information for the current block may be derived based on values of the reconstructed samples of the specific neighboring block, and values of the reconstructed samples of the reference block. In this case, the filter coefficient in the information about the filter may be derived based on the mathematical formula 1 as described above.

Meanwhile, the type of the filter for the current block is not fixed to one type. Rather, in the decoding process, one of a plurality of filters may be selectively used as a filter for the current block. That is, the decoder may derive a candidate list including types of a plurality of filters, and the decoder may select the specific candidate from the candidate list and select the type of filter for the current block. The decoder may construct a candidate list including N+1 types of filters. The decoder may select one specific candidate from the candidate list and derive the type of the filter for the current block. The candidate list may include N+1 types of filters. In this connection, the filters may include filters having a number of features, including a high pass filter, a low pass filter, a Wiener filter, and a de-ringing filter, etc. In the decoding process, the decoder may derive an optimal filter by comparing performances of the N+1 types of filters. The decoder may perform filtering on the current block using each filter. The decoder may verify the efficiency of the filtering by the filters and compare the efficiencies thereof with each other, thereby deriving the optimal filter. The decoder may store the optimal information, i.e. the information of the derived filter. The information of the derived filter may vary depending on the type of the filter. In one example, when the derived filter is a Wiener filter, the size, coefficient information, etc. of the filter may be stored. The decoder may use the bit stream to obtain index information indicating the derived filter. The filter indicated by the index information in the candidate list may be derived as a filter for the current block. The value of the index information indicating the filters may be represented by i. i may be represented by 0 to N.

The decoder performs filtering on the current block based on the filter information (S1130). Filtering for the current block may be applied to reconstructed samples for the current block. That is, the decoder generates predicted samples of the current block based on intra prediction or inter prediction. The decoder may generate the reconstructed samples of the current block by adding residual samples to the predicted samples of the current block. Filtering of the current block may be applied to the reconstructed samples thereof. Thus, the objective/subjective visual quality of the reconstructed picture can be improved.

Figure 12:
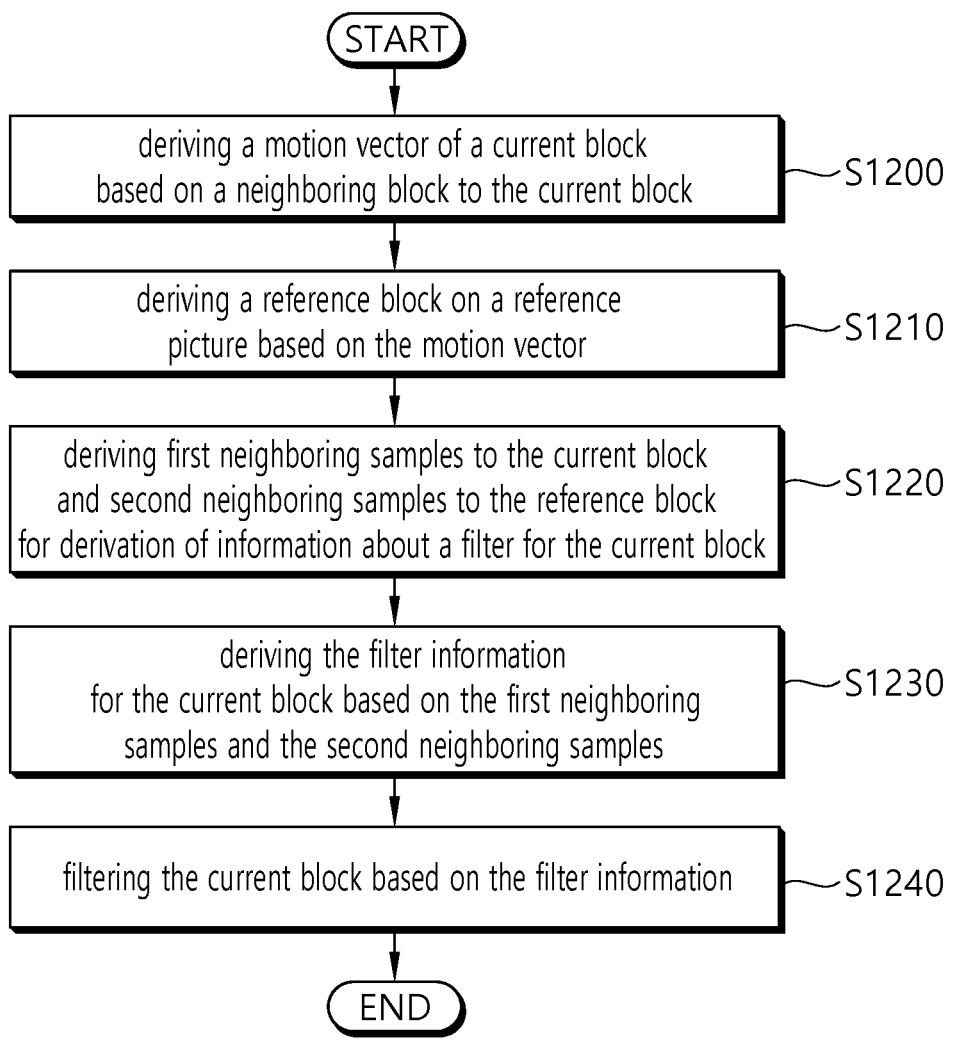
FIG. 12 outlines the filtering method by the decoding device according to the present disclosure.

FIG. 12 schematically shows the decoder-based filtering method according to the present disclosure. The method described in FIG. 12 may also be performed by the decoder described in FIG. 2. More specifically, for example, S1200 to S1210 of FIG. 12 may be performed by the predictor of the decoder, and S1220 to S1240 may be performed by the filter of the decoder.

The decoder derives a motion vector for the current block based on a neighboring block to the current block S1200. In this connection, the decoder may use one motion vector from the merge candidate list as a motion vector for the current block (for a merge mode). Alternatively, the decoder may use one motion vector predictor from a motion vector predictor candidate list as a motion vector predictor for the current block. The decoder may add MVD obtained from the bit stream to the motion vector predictor to derive the motion vector for the current block (in the case of AMVP mode). Information on the inter prediction mode may be obtained using the bitstream.

The decoder derives a reference block on the reference picture based on the motion vector (S1210). The decoder may derive the reference block corresponding to the current block having a location on the reference picture, indicated by the derived motion vector for the current block.

The decoder determines the first neighboring samples to the current block and the second neighboring samples to the reference block for filter information derivation for the current block (S1220). The decoder may determine the neighboring samples to the current block as the first neighboring samples to the current block for the filter information derivation for the current block. Further, the decoder may determine the neighboring samples to the reference block corresponding to the first neighboring samples as the second neighboring samples.

In one embodiment, when the coordinate of the top-left sample position for the current block is (0, 0) and the width and height of the current block are W and H, respectively, the decoder may determine the first neighboring samples including a top-left neighboring sample with (−1, −1) coordinate, upper neighboring samples with (0, −1) to (W−1,−1), and left neighboring samples with (−1, 0) to (−1, H−1). The decoder may determine the neighboring samples to the reference block corresponding to the neighboring samples as the second neighboring samples.

In another embodiment, when the coordinate of the top-left sample position for the current block is (0, 0) and the width and height of the current block are W and H, respectively, the decoder may determine the first neighboring samples including a top-left neighboring sample with (−1, −1) coordinate, upper neighboring samples with (0, −1) to (W−1,−1), left neighboring samples with (−1, 0) to (−1, H−1), a top-left neighboring sample with (−2, −2) coordinates, upper neighboring samples with (0, −2) to (W−1, −2) coordinates, and left neighboring samples with (−2, 0) to (−2, H−1) coordinates. The decoder may determine the neighboring samples to the reference block corresponding to the neighboring samples as the second neighboring samples.

The decoder derives filter information for the current block based on the first neighboring samples and the second neighboring samples (S1230). The filter information may be vary depending on the type of the filter. Specifically, when the derived filter is a Wiener filter, the filter information may include size, coefficient information, etc. of the filter. The filter information about the current block may be derived based on information about the first neighboring samples and information about the second neighboring samples. Specifically, the filter information may be derived based on values of reconstructed samples of the first neighboring samples and values of reconstructed samples of the second neighboring samples. In this case, the filter coefficient in the information about the filter may be derived based on the mathematical formula 1 as described above.

Meanwhile, the type of the filter for the current block is not fixed to one type. Rather, in the decoding process, one of a plurality of filters may be selectively used as a filter for the current block. That is, the decoder may derive a candidate list including types of a plurality of filters, and the decoder may select the specific candidate from the candidate list and select the type of filter for the current block. The decoder may construct a candidate list including N+1 types of filters. The decoder may select one specific candidate from the candidate list and derive the type of the filter for the current block. The candidate list may include N+1 types of filters. In this connection, the filters may include filters having a number of features, including a high pass filter, a low pass filter, a Wiener filter, and a de-ringing filter, etc. In the decoding process, the decoder may derive an optimal filter by comparing performances of the N+1 types of filters.

Furthermore, the decoder may derive horizontal filter information based on the first upper neighboring samples and the second upper neighboring samples. The decoder may derive vertical filter information based on the first left neighboring samples and the second left neighboring samples. The first neighboring samples may include the first upper neighboring samples and the first left neighboring samples to the current block. The second neighboring samples may include the second upper neighboring samples and the second left neighboring samples to the reference block.

The decoder may use a bit stream to obtain filter index information indicating the filters in the candidate list. The decoder may select the specific candidate from the candidate list based on the filter index. The value of the filter index may be represented by i. The i may be represented by 0 to N.

The decoder performs filtering on the current block based on the filter information (1240). The decoder may generate predicted samples for the current block, for example, based on inter prediction. The decoder may generate reconstructed samples for the current block based on the predicted samples. Filtering for the current block may be applied to reconstructed samples for the current block. The decoder performs filtering based on the derived filter information, thereby improving the objective/subjective visual quality of the reconstructed picture.

According to the present disclosure, it is possible to improve the subjective/objective picture quality and the coding efficiency by filtering a current block.

According to the present disclosure, filter information may be derived based on neighboring blocks or neighboring samples to a current block that have already been decoded. This reduces or eliminates the amount of data needed for transmission of information needed to generate the filter, thereby improving the overall coding efficiency.

According to the present disclosure, neighboring blocks or neighboring samples to the current block may be selected to derive the type of the filter for the current block and the information used for generating the filter. This enables adaptive determination of whether or not the filter is applied, the filter shape, and the filter coefficient. This allows efficient filtering to be effectively applied to the image characteristics of each image region.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The above-described method according to the present invention may be implemented in a software form. The encoder and/or decoder according to the present invention may be included in a device that performs image processing in, a for example, TV, a computer, a smart phone, a set-top box, a display device, and the like.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:
1. A filtering method performed by a decoder, the method comprising:
deriving a candidate list based on neighboring blocks to a current block;
selecting a specific candidate from the candidate list;

deriving a specific neighboring block included in the specific candidate;

deriving a reference block in a reference picture corresponding to the specific neighboring block;

deriving information on a filter for the current block based on the specific neighboring block and the reference block; and filtering reconstructed samples of the current block based on the information on the filter, wherein the candidate list comprises a combination of a left neighboring block and an upper-left neighboring block, a combination of the left neighboring block, the upper-left neighboring block, and an upper neighboring block, a combination of the left neighboring block, the upper-left neighboring block, the upper neighboring block, and an upper-right neighboring block, and a combination of the upper neighboring block and the upper-right neighboring block, wherein the information on the filter includes a filter coefficient of the current block, and the filter coefficient is derived based on a following mathematical formula:

$$E[(R1-C*P1)]^2,$$

where R1 represents the specific neighboring block, P1 represents the reference block, C represents a variable, and E represents a function to obtain a minimum value, and wherein the filter coefficient is derived from a specific value of C that minimizes the square of a difference between the R1 and the C*P1 based on the mathematical formula.

2. The method of claim 1, wherein the information on the filter includes at least one of a type or a size of the filter for the current block.

3. The method of claim 1, further comprising: obtaining a filter index from a bit stream, wherein the candidate list is derived based on available neighboring blocks among the neighboring blocks, wherein the candidate list is derived by indexing the available neighboring blocks based on a predetermined priority thereof, and wherein a candidate having an index value corresponding to a value of the filter index is selected from the candidate list as the specific candidate.

4. The method of claim 1, wherein deriving the information on the filter for the current block based on the specific neighboring block and the reference block includes:

deriving information on the filter for the specific neighboring block via a comparison between reconstructed samples of the specific neighboring block and reconstructed samples of the reference block; and deriving the information on the filter for the current block based on the information on the filter for the specific neighboring block.

5. The method of claim 1, wherein the neighboring blocks include an upper neighboring block, a left neighboring block, an upper-left neighboring block, and an upper-right neighboring block to the current block.

6. The method of claim 1, wherein deriving the specific neighboring block comprises:

determining availability of an upper neighboring block, an upper-left neighboring block, a left neighboring block, and an upper-right neighboring block to the current block, based on a predetermined priority thereof; and deriving, as the specific neighboring block, one of the upper neighboring block, the upper-left neighboring block, the left neighboring block, and the upper-right neighboring block, wherein said one block is determined to be available with a highest priority.

7. A filtering method performed by an encoder, the method comprising:

deriving a candidate list based on neighboring blocks to a current block;

selecting a specific candidate from the candidate list;

deriving a specific neighboring block included in the specific candidate;

deriving a reference block in a reference picture corresponding to the specific neighboring block;

deriving information on a filter for the current block based on the specific neighboring block and the reference block;

filtering reconstructed samples of the current block based on the information on the filter; and encoding and outputting information on the filtering performed on the current block, wherein the candidate list comprises a combination of a left neighboring block and an upper-left neighboring block, a combination of the left neighboring block, the upper-left neighboring block, and an upper neighboring block, a combination of the left neighboring block, the upper-left neighboring block, the upper neighboring block, and an upper-right neighboring block, and a combination of the upper neighboring block and the upper-right neighboring block, wherein the information on the filter includes a filter coefficient of the current block, and the filter coefficient is derived based on a following mathematical formula:

$$E[(R1-C*P1)]^2,$$

where R1 represents the specific neighboring block, P1 represents the reference block, C represents a variable, and E represents a function to obtain a minimum value, and wherein the filter coefficient is derived from a specific value of C that minimizes the square of a difference between the R1 and the C*P1 based on the mathematical formula.

* * * * *